US008671902B2

(12) United States Patent
Aso et al.

(10) Patent No.: US 8,671,902 B2
(45) Date of Patent: Mar. 18, 2014

(54) CONTROL APPARATUS FOR INTERNAL COMBUSTION ENGINE

(75) Inventors: Koji Aso, Susono (JP); Hiroshi Tanaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/393,738

(22) PCT Filed: Dec. 24, 2010

(86) PCT No.: PCT/JP2010/073346
§ 371 (c)(1), (2), (4) Date: Mar. 1, 2012

(87) PCT Pub. No.: WO2012/086059
PCT Pub. Date: Jun. 28, 2012

(65) Prior Publication Data
US 2013/0255630 A1 Oct. 3, 2013

(51) Int. Cl.
*F02D 41/06* (2006.01)
*F02M 1/00* (2006.01)
*G06F 19/00* (2011.01)
*G06G 7/70* (2006.01)

(52) U.S. Cl.
USPC ...................................... 123/179.16; 701/113

(58) Field of Classification Search
USPC ............... 123/179.1, 179.12, 179.16, 179.18, 123/179.3, 198 DB, 198 DC, 198 F, 325, 123/332, 366, 406.53, 481, 491, 685; 701/102, 103, 104, 112, 113
See application file for complete search history.

(56) References Cited

U.S. PATENT DOCUMENTS 4,007,590 A * 2/1977 Nagai et al. ..................... 60/284
5,690,073 A * 11/1997 Fuwa ............................ 123/443
6,286,488 B1 * 9/2001 Wisinski ....................... 123/481
6,571,772 B1 * 6/2003 Ott et al. ....................... 123/481

(Continued)

FOREIGN PATENT DOCUMENTS

JP A-08-338282 12/1996
JP A-2002-070618 3/2002

(Continued)

OTHER PUBLICATIONS

Mar. 8, 2011 International Search Report issued in International Patent Application No. PCT/JP2010/073346 (with translation).

*Primary Examiner* — Stephen K Cronin
*Assistant Examiner* — Sizo Vilakazi
(74) *Attorney, Agent, or Firm* — Oliff PLC

(57) ABSTRACT

A control apparatus for an internal combustion engine that can suppress the emission of unburned HC accompanying start-up of an internal combustion engine. The control apparatus including a fuel supply control unit that initially supplies fuel to only some cylinders, and delays the start of fuel supply to delayed cylinders that are cylinders other than the aforementioned cylinders; an engine discharge gas HC amount predicting unit that calculates a relationship between a delayed cylinder starting engine speed that is a engine speed at a timing at which a cycle starts in which a delayed cylinder initially carries out combustion and a predicted value of an engine discharge gas HC amount; and a target engine speed calculating unit that calculates a target engine speed that is a target value of the delayed cylinder starting engine speed.

5 Claims, 7 Drawing Sheets

(56) References Cited

U.S. PATENT DOCUMENTS

| | | | | |
|---|---|---|---|---|
| 7,931,002 | B1 * | 4/2011 | Gibson et al. | 123/179.4 |
| 8,136,497 | B2 * | 3/2012 | Gibson et al. | 123/179.4 |
| 8,225,771 | B2 * | 7/2012 | Aso et al. | 123/481 |
| 2007/0017487 | A1 * | 1/2007 | Song et al. | 123/478 |
| 2011/0197860 | A1 * | 8/2011 | Aso et al. | 123/491 |

FOREIGN PATENT DOCUMENTS

| | | |
|---|---|---|
| JP | A-2004-270471 | 9/2004 |
| JP | A-2005-009403 | 1/2005 |
| JP | A-2007-162702 | 6/2007 |
| JP | A-2007-285265 | 11/2007 |
| JP | A-2011-163267 | 8/2011 |

* cited by examiner

CONTROL APPARATUS FOR INTERNAL COMBUSTION ENGINE

TECHNICAL FIELD

The present invention relates to a control apparatus for an internal combustion engine.

BACKGROUND ART

In an internal combustion engine, although a part of fuel that is injected into an intake port from a fuel injector vaporizes in the state it is in when it is injected, the remainder adheres temporarily to a wall surface (including an intake valve; the same applies hereunder) of the intake port. The fuel that adheres to the intake port is evaporated by a negative pressure inside an intake pipe or the action of heat from the intake port wall surface, and forms an air-fuel mixture together with a vaporized part of fuel that has been newly injected from the fuel injector. At a time of steady operation, there is a balance between the amount of fuel that is injected from the fuel injector and adheres to the intake port, and the amount of fuel that has been adhered to the intake port that vaporizes. Therefore, by injecting a fuel amount that corresponds to the theoretical air-fuel ratio from the fuel injector, it is possible to make the air-fuel ratio of an air-fuel mixture that is formed in a cylinder equal to the theoretical air-fuel ratio.

However, when starting an internal combustion engine, particularly at cold start-up, the temperature inside the intake pipe and the temperature of the intake port wall surface are low, and furthermore, a negative pressure is not yet generated inside the intake pipe. Further, the amount of fuel that is adhered to the intake port from prior to start-up is not large. Therefore, a large portion of the fuel that is injected from the fuel injector at start-up adheres to the intake port. Hence, in order to form an air-fuel mixture of an ignitable concentration inside a cylinder, in at least the initial cycle when starting the engine, it is necessary to supply a large amount of fuel in comparison to a time of steady operation after warming up is completed. Further, since fuel supply is performed in cylinder units, in the case of a multi-cylinder internal combustion engine that has a large number of cylinders, a large quantity of fuel is supplied in sequence to each cylinder. However, when a large quantity of fuel is supplied, a proportionately large amount of unburned hydrocarbon (HC) is discharged to an exhaust passage from inside the respective cylinders. Although a catalyst for purifying exhaust gas is disposed in the exhaust passage, because the temperature of the catalyst is low at start-up, a certain period of time is required until the purification ability of the catalyst is activated. Accordingly, it is desirable to suppress the discharge of unburned HC as much as possible from inside the cylinders at least until the catalyst is activated. Reducing unburned HC that is generated at start-up is ranked as one of the important issues for motor vehicles that have an internal combustion engine as a motive force.

Various kinds of technology have been proposed to solve the above problem. Among these, Patent Literature 1 that is mentioned below (hereunder, referred to as “prior art”) discloses technology that relates to the supply of fuel when starting a multi-cylinder internal combustion engine. As is also described in Patent Literature 1, it is not always necessary to supply fuel to all cylinders in order to start-up a multi-cylinder internal combustion engine, and it is possible to start the internal combustion engine even if the fuel supply to some of the cylinders is stopped. By starting up an internal combustion engine in a manner in which the fuel supply to some of the cylinders is stopped, it is possible to significantly reduce the amount of unburned HC that is discharged at start-up. The aforementioned prior art is an invention that is based on such knowledge, and is configured so as to determine which cylinders to supply fuel to and which cylinders to stop the supply of fuel to based on the result of a cylinder determination that is performed at start-up, and to control the fuel supply to each cylinder in accordance with the determination result. More specifically, according to the aforementioned prior art, a pattern for supplying fuel among cylinders is determined according to the water temperature at start-up. A plurality of fuel supply patterns that depend on whether the water temperature is high or low are prepared. The patterns are set so that a pattern that corresponds to a high water temperature stops the fuel supply to a large number of cylinders, while a pattern that corresponds to a low water temperature stops the fuel supply to a small number of cylinders. After start-up is completed (when the engine speed exceeds 400 rpm), fuel supply is performed to all of the cylinders.

CITATION LIST

Patent Literature

Patent Literature 1: Japanese Patent Laid-Open No. 8-338282
Patent Literature 2: Japanese Patent Laid-Open No. 2004-270471
Patent Literature 3: Japanese Patent Laid-Open No. 2007-285265

SUMMARY OF INVENTION

Technical Problem

According to the above described prior art, a large amount of fuel is supplied in the initial fuel supply operation to cylinders to which fuel supply is to be carried out from the beginning of start-up. In contrast, when commencing the fuel supply to cylinders to which the fuel supply was stopped at the beginning of start-up, the fuel supply amount to the cylinders (hereunder, referred to as “delayed cylinders”) is reduced in comparison to the initial fuel supply amount to the cylinders to which fuel has been supplied from the beginning.

The reasons the initial fuel supply amount to a delayed cylinder can be reduced are as follows. At a delayed cylinder, in a period before fuel supply starts, air compression that is not accompanied by combustion is performed, and the temperature inside the cylinder rises as a result of the air compression. Further, since the engine speed increases in the period before the fuel supply to the delayed cylinders starts, a negative pressure arises inside the intake pipe accompanying the increase in the engine speed. For these reasons, an environment that promotes the vaporization of fuel has been created at the time of the initial fuel supply to delayed cylinders. Consequently, the amount of fuel that is initially supplied to the delayed cylinders can be reduced in comparison to the cylinders to which fuel is supplied from the beginning of start-up. Thus, the amount of unburned HC emissions can be further decreased.

According to the aforementioned prior art, the completion of start-up is determined by taking the fact that the engine speed has exceeded a predetermined value (400 rpm) as a criterion, and when it is determined that start-up is completed, fuel supply to delayed cylinders starts, and the engine thereby shifts to operation on all cylinders. However, according to studies carried out by the present inventors, when the timing to start the supply of fuel to delayed cylinders is determined using this method, the amount of unburned HC emissions can not always be adequately reduced. More specifically, there is room for improvement in the aforementioned prior art.

The present invention has been made in view of the above circumstances, and an object of the invention is to provide a control apparatus for an internal combustion engine that can suppress unburned HC emissions that accompany the start-up of an internal combustion engine.

Solution to Problem

A first invention for achieving the above object is a control apparatus for an internal combustion engine, comprising:

fuel supply control means that, when a multi-cylinder internal combustion engine is started, initially supplies fuel to only some cylinders, and delays a start of fuel supply to a delayed cylinder that is a cylinder other than the cylinders to which fuel is initially supplied;

representative temperature acquiring means that acquires a representative temperature of the internal combustion engine;

engine discharge gas HC amount predicting means that, based on predetermined parameters including at least the representative temperature, calculates a relationship between a delayed cylinder starting engine speed that is a engine speed at a timing at which a cycle starts in which the delayed cylinder initially carries out combustion and a predicted value of an engine discharge gas HC amount that is a HC amount that is output from the internal combustion engine when starting the internal combustion engine; and target engine speed calculating means that calculates a target engine speed that is a target value of the delayed cylinder starting engine speed, based on the relationship that is calculated by the engine discharge gas HC amount predicting means;

wherein the fuel supply control means determines a timing at which to start to supply fuel to the delayed cylinder so that the delayed cylinder starting engine speed is in a vicinity of the target engine speed.

A second invention is in accordance with the first invention, wherein when a predetermined time limit is exceeded, irrespective of a engine speed, the fuel supply control means forcibly starts a fuel supply to the delayed cylinder.

A third invention is in accordance with the second invention, further comprising combustion count correcting means that, based on the predetermined parameters and the target engine speed, corrects a number of combustions in the internal combustion engine overall that are scheduled to be carried out within the time limit.

A fourth invention is in accordance with any one of the first to the third inventions, further comprising:

alcohol concentration acquiring means that acquires an alcohol concentration of a fuel that is supplied to the internal combustion engine;

wherein the alcohol concentration is included in the predetermined parameters.

A fifth invention is in accordance with any one of the first to the fourth inventions, wherein the target engine speed calculating means takes a delayed cylinder starting engine speed of a part at which a slope of the predicted value of the engine discharge gas HC amount changes suddenly in the relationship as the target engine speed.

Advantageous Effects of Invention

According to the first invention, by controlling a timing at which to start to supply fuel to a delayed cylinder based on predetermined parameters including a representative temperature of the internal combustion engine, the amount of unburned HC that is discharged into the atmosphere from an end (tailpipe) of an exhaust passage at start-up can be reliably reduced.

According to the second invention, it is possible to reliably prevent a state in which there are large vibrations in an internal combustion engine from continuing for a long time at start-up.

According to the third invention, prevention of a state in which large vibrations in an internal combustion engine continue for a long time at start-up, and a reduction in the amount of unburned HC that is discharged into the atmosphere at start-up can both be more reliably achieved.

According to the fourth invention, in an internal combustion engine that is capable of using a fuel containing alcohol, the above effects can be reliably obtained even when fuels of various alcohol concentrations are used.

According to the fifth invention, the amount of unburned HC that is discharged into the atmosphere at start-up can be reduced more reliably.

DESCRIPTION OF EMBODIMENTS

Figure 1:
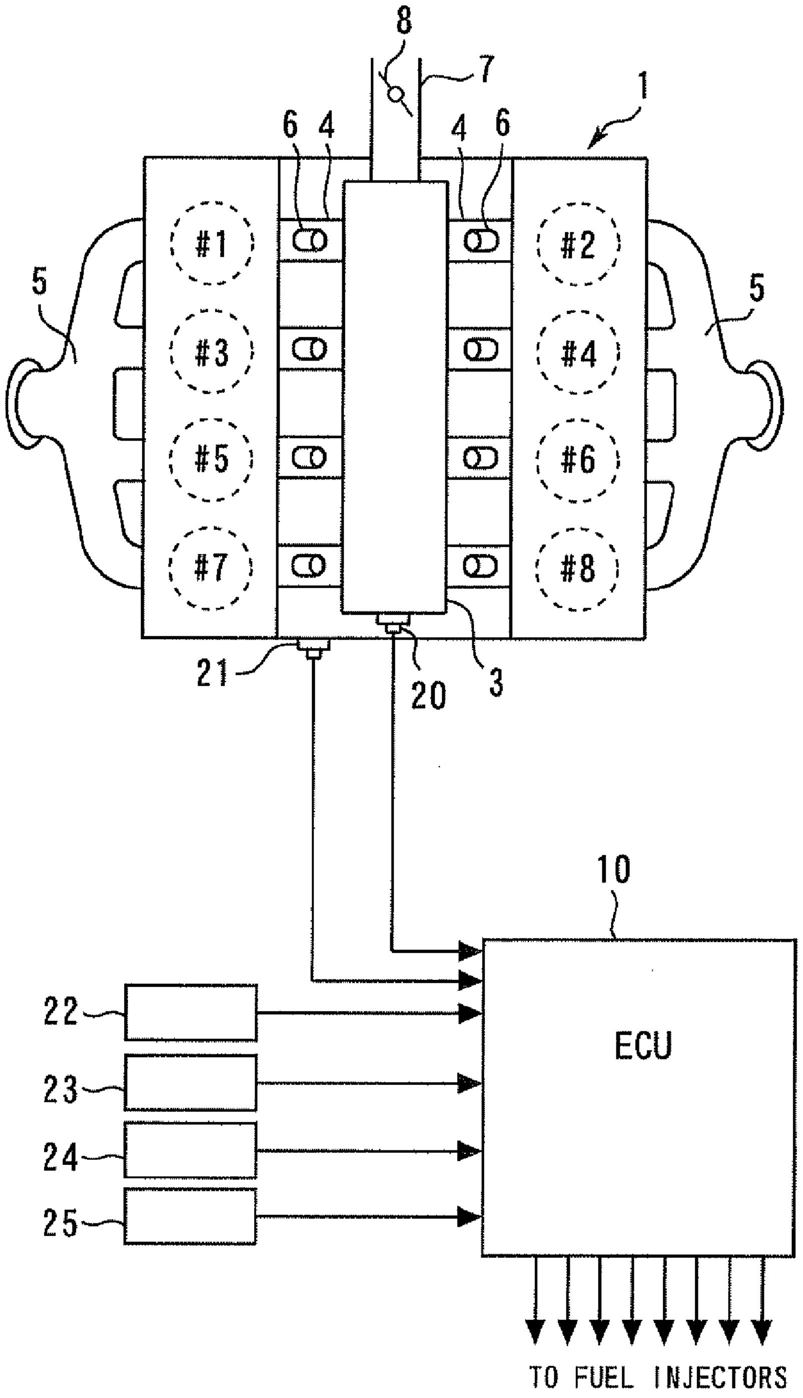
FIG. 1 is a view for describing the system configuration of Embodiment 1 of the present invention.

Hereunder, embodiments of the present invention are described with reference to the attached drawings. Note that common elements in the drawings are denoted by like reference numerals, and duplicate descriptions of those elements are omitted.

Embodiment 1

FIG. 1 is a view for describing the system configuration of Embodiment 1 of the present invention. As shown in FIG. 1, the system of the present embodiment includes an internal combustion engine 1 (hereunder, referred to simply as "engine"). The engine 1 is a V8 four-stroke reciprocating engine that has eight cylinders. In the following description, the numbers of the respective cylinders are denoted by reference numerals #1 to #8. The engine 1 is a spark-ignition engine that includes a spark plug (unshown) for each cylinder. The engine 1 is capable of operating using 100% gasoline as a fuel, and is also capable of operating using an alcohol-containing fuel in which gasoline and an alcohol (ethanol, methanol or the like) are mixed. Note that the number of cylinders and the cylinder arrangement of an engine according to the present invention are not limited to that of a V8 engine. For example, the engine may be an in-line six-cylinder engine, a V6 engine, a V10 engine, or a V12 engine.

Each cylinder is connected to a surge tank 3 by an exhaust branch pipe 4. The surge tank 3 and the respective exhaust branch pipes 4 are referred to collectively as "intake pipes". A fuel injector 6 is fitted to each exhaust branch pipe 4. Each fuel injector 6 injects fuel towards the inside of an intake port of the corresponding cylinder. The surge tank 3 is connected to an air cleaner (unshown) via an air intake duct 7. A throttle 8 is disposed in the air intake duct 7. An exhaust manifold 5 is provided for each bank on the exhaust side of the engine 1. An exhaust passage (not shown) is connected to each exhaust manifold 5. An exhaust gas purification catalyst (not shown) for purifying exhaust gas is disposed in the exhaust passage.

The system of the present embodiment also includes various kinds of sensors and an ECU (Electronic Control Unit) 10. An intake pipe pressure sensor 20 that detects a pressure inside the surge tank 3 (intake pipe pressure), a water temperature sensor 21 that detects a coolant temperature of the engine 1, a crank angle sensor 22 that detects a rotational angle of a crankshaft of the engine 1, a cylinder discrimination sensor 23, an air flow meter 24 that detects an intake air flow of the engine 1, and a fuel property sensor 25 that detects an alcohol concentration of a fuel that is supplied to the engine 1 are provided as sensors. These sensors are electrically connected to the ECU 10. The ECU 10 controls the operation of various actuators including the fuel injectors 6 based on signals from the various sensors. The system of the present embodiment also includes a starting device (unshown), such as a self-starting motor, that rotationally drives the crankshaft of the engine 1 when starting the engine 1.

When starting the engine 1, the ease of evaporation of fuel injected from the fuel injectors 6 is significantly influenced by the temperature of the respective intake ports. Normally, the temperature of the intake port is approximately the same as the engine coolant temperature. Therefore, according to the present embodiment, an engine coolant temperature that is detected by the water temperature sensor 21 can be used as a representative temperature of the engine 1. However, according to the present invention, a temperature that is used as a representative temperature of the engine 1 is not limited to the engine coolant temperature. For example, the intake port temperature may be directly detected by a sensor, and the thus-detected intake port temperature may be used as the representative temperature of the engine 1.

The fuel property sensor 25 is arranged at any place along a fuel supply passage from a fuel tank to the fuel injectors 6. Various kinds of known sensors, such as an optical sensor or a capacitance sensor, can be used as the fuel property sensor 25. Although according to the present embodiment the alcohol concentration of a fuel is directly detected by the fuel property sensor 25, the method of acquiring the alcohol concentration of a fuel according to the present invention is not limited to a method that uses the fuel property sensor 25. For example, a configuration may be adopted in which the alcohol concentration of a fuel is detected (estimated) based on a learned value for air-fuel ratio feedback control. More specifically, since the theoretical air-fuel ratio values of gasoline and alcohol are different, a value of a theoretical air-fuel ratio of an alcohol-containing fuel differs according to the alcohol concentration thereof. Therefore, it is possible to acquire an alcohol concentration of a fuel based on a theoretical air-fuel ratio value that is learned by means of feedback of a signal of an air-fuel ratio sensor (unshown) that is provided in the exhaust passage of the engine 1.

Figure 2:
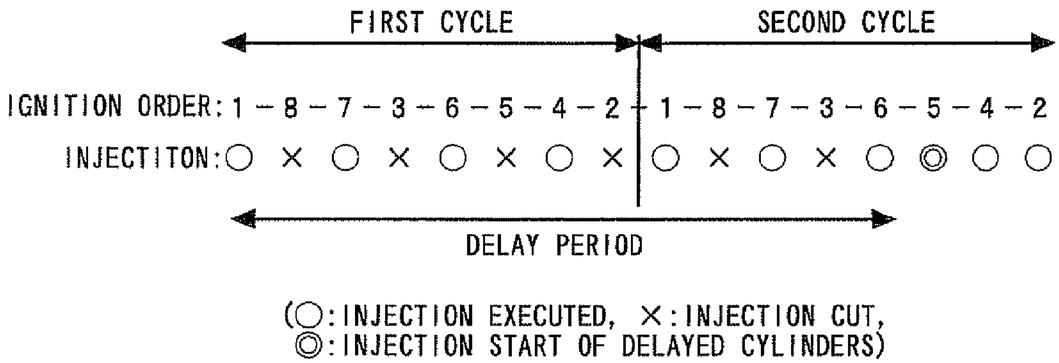
FIG. 2 is a view that illustrates an example of cylinders to which fuel injection is executed and cylinders to which fuel injection is not executed when starting the engine.

When the engine 1 is started, the ECU 10 performs control so as to supply fuel from the fuel injectors 6 to only some cylinders at the beginning, and to delay the start of fuel supply from the fuel injectors 6 to other cylinders (hereunder, referred to as "delayed cylinders"). FIG. 2 is a view that illustrates an example of cylinders to which fuel injection is executed and cylinders to which fuel injection is not executed when starting the engine. As shown in FIG. 2, it is assumed that the ignition order for the engine 1 according to the present embodiment is cylinders #1-#8-#7-#3-#6-#5-#4-#2. According to the example shown in FIG. 2, when first starting the engine (from the first cycle), fuel is injected to the four cylinders #1, #4, #6, and #7, while the four cylinders #2, #3, #5, and #8 are treated as delayed cylinders. According to the example shown in FIG. 2, by selecting the delayed cylinders in this manner, the combustion intervals are uniform in the period before starting to supply fuel to the delayed cylinders. Hence vibrations can be reliably suppressed, which is preferable. However, the number of delayed cylinders is not limited to four. The number of delayed cylinders may be increased or decreased in accordance with conditions such as the engine coolant temperature.

According to the example shown in FIG. 2, during the first cycle when starting the engine, fuel injection to cylinders #8, #3, #5 and #2 is not executed (fuel injection is cut). In the second cycle, among the delayed cylinders, fuel injection is not executed (fuel injection is cut) with respect to cylinders #8 and #3, and fuel injection is executed with respect to cylinders #5 and #2. More specifically, according to the example shown in FIG. 2, fuel injection with respect to the delayed cylinders is started from cylinder #5 in the second cycle, and thereafter fuel injection is executed with respect to all the cylinders. In the following description, the period until fuel injection is started with respect to the delayed cylinders is referred to as a "delay period". The delay period can be represented by a number of cycles as described hereafter. Since the engine 1 has eight cylinders, the number of cycles can be counted in increments of $\frac{1}{8}$. According to the example shown in FIG. 2, since fuel injection with respect to cylinder #5 in the second cycle is the start of fuel injection to the delayed cylinders, the period up to the fuel injection that is performed immediately prior thereto, that is, the period up to the fuel injection with respect to cylinder #6 in the second cycle, corresponds to the delay period. The fuel injection to cylinder #6 in the second cycle is fifth in the ignition order within the second cycle. Therefore, according to the example shown in FIG. 2, the delay period is $(1+\frac{5}{8})$ cycles.

According to the present embodiment, a time point at which all the delayed cylinders have finished a single combustion is referred to as completion of start-up of the engine 1. More specifically, a time point when all cylinders of the engine 1 have finished at least a single combustion is taken as being the completion of the engine start-up operation. In the period up to when engine start-up is completed, it is desirable that the timing of fuel injection to each cylinder is controlled so that fuel injection ends before the intake valve opens. If fuel that is injected from the fuel injector 6 enters directly into the cylinder, the fuel will be ignited without being adequately atomized, and the amount of unburned HC (unburned fuel components) emissions is liable to increase. In contrast, if fuel injection is completed before the intake valve opens, the fuel that is injected from the fuel injector 6 can be reliably prevented from entering directly into the cylinder. Therefore, since fuel that enters into the cylinder can be reliably atomized, the amount of unburned HC emissions can be decreased.

The present inventors carried out extensive studies with a view to reducing the amount of unburned HC that is discharged to the atmosphere accompanying start-up of the engine 1, and found that the amount of unburned HC that is discharged to the atmosphere changes significantly according to the timing at which delayed cylinders begin the initial combustion cycle (that is, according to the length of the delay period).

Figure 3:
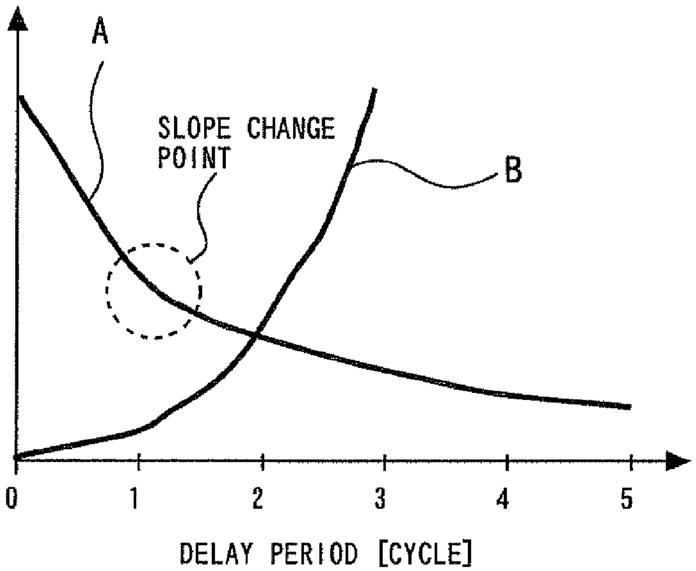
FIG. 3 is a view for describing the relationship between the length of a delay period and the amount of unburned HC emissions accompanying start-up of the engine 1.

FIG. 3 is a view for describing the relationship between the length of a delay period and the amount of unburned HC emissions accompanying start-up of the engine 1. In this connection, in FIG. 3 (and also in FIG. 4 and FIG. 5 that are described later), a delay period of zero means that fuel is supplied to all cylinders from the beginning of engine start-up. A graph denoted by reference character A in FIG. 3 shows the total amount of unburned HC (hereunder, referred to as "engine discharge gas HC amount") that is discharged from the engine 1 when starting the engine 1. The engine discharge gas HC amount is the HC amount prior to purification at the exhaust gas purification catalyst. According to the present embodiment, it is assumed that the term "engine discharge gas HC amount" refers to the total amount of unburned HC that is discharged from the engine 1 during a period until start-up of the engine 1 is completed, or during a period until a predetermined time elapses after start-up commences. As shown in the graph, the engine discharge gas HC amount decreases as the delay period increases. This is due to the following reasons.

The engine discharge gas HC amount is significantly influenced by the engine speed at the timing at which a cycle starts in which a delayed cylinder initially carries out combustion (hereunder, referred to as "delayed cylinder starting engine speed"). With respect to the example shown in FIG. 2, the term "timing at which a cycle starts in which a delayed cylinder initially carries out combustion" corresponds to a timing at which the intake valve of cylinder #5 opens in the second cycle. The higher that the delayed cylinder starting engine speed is, the higher that the piston speed will be in the intake stroke of the initial combustion cycle of the delayed cylinder. Hence, the flow rate of air that passes through the intake valve (hereunder, referred to as "intake valve peripheral flow rate") will increase. Consequently, evaporation of fuel that is adhered to the wall surface of the intake port or to the intake valve will be accelerated. Furthermore, the higher that the delayed cylinder starting engine speed is, the greater the strength of a tumble (vertical swirl) that is formed by the air-fuel mixture that flows into the cylinder will be during the initial combustion cycle of the delayed cylinder. For such reasons, because evaporation of fuel is promoted and combustion is also improved by a strong tumble in a delayed cylinder that starts combustion, the higher the delayed cylinder starting engine speed is, the greater the degree to which the amount of unburned HC emissions decreases. Hence, the engine discharge gas HC amount also decreases. Conversely, the lower that the delayed cylinder starting engine speed is, the greater the degree to which the engine discharge gas HC amount increases, because the amount of unburned HC discharged from the delayed cylinder increases.

Figure 4:
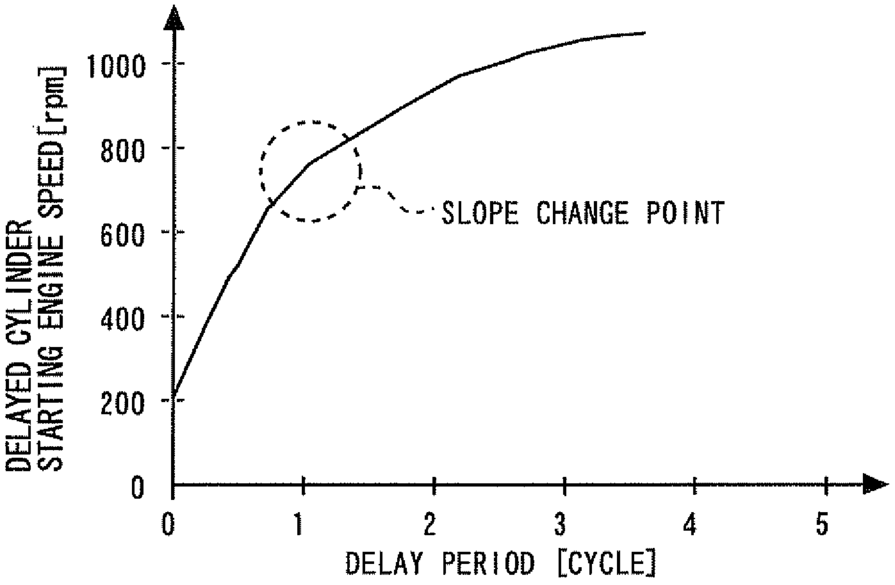
FIG. 4 is a view that illustrates the relationship between the length of a delay period and the delayed cylinder starting engine speed.

FIG. 4 is a view that illustrates the relationship between the length of a delay period and the delayed cylinder starting engine speed. In FIG. 4, when the length of the delay period is zero, it means that the delayed cylinder starting engine speed (200 rpm) is the rotational speed of the crankshaft that is rotated by the starting device. During the delay period the engine speed increases as the result of torque that is generated by combustion in cylinders other than the delayed cylinders. Therefore, as shown in FIG. 4, the longer the delay period is, the greater the increase is in the delayed cylinder starting engine speed. Thus, as shown by the graph A in FIG. 3, as the delay period increases, the engine discharge gas HC amount decreases. Conversely, as the delay period decreases, the engine discharge gas HC amount increases.

Thus, the engine discharge gas HC amount can be reduced by lengthening the delay period. However, during the delay period, because only the cylinders other than the delayed cylinders are carrying out combustion operations, the thermal energy that is supplied to the exhaust gas purification catalyst is less in comparison to when all cylinders are carrying out combustion operations. Consequently, the longer that the delay period is, the longer it takes for the exhaust gas purification catalyst to warm up. When warming up of the exhaust gas purification catalyst is delayed, the amount of HC that is purified at the exhaust gas purification catalyst decreases. Hence, the amount of HC discharged into the atmosphere from the tailpipe at the end of the exhaust passage (hereunder, referred to as "tail HC amount") increases. Reference character B in FIG. 3 denotes a graph that shows a tendency for the tail HC amount to increase due to a delay in warm-up of the exhaust gas purification catalyst. As shown by the graph, there is a tendency for the increase in the tail HC amount caused by a delay in warm-up of the exhaust gas purification catalyst to become larger as the delay period is lengthened.

Figure 5:
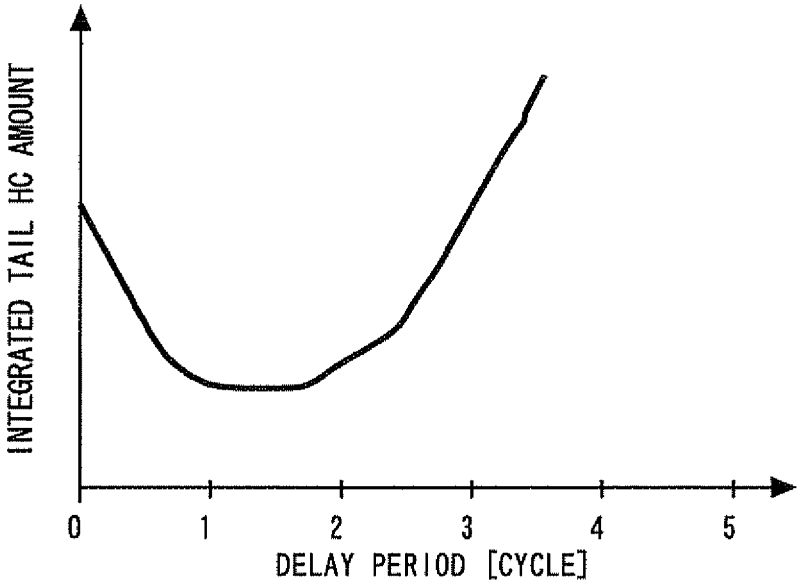
FIG. 5 is a view that illustrates the relationship between the integrated tail HC amount when starting the engine and the length of the delay period.

The tail HC amount is more important than the engine discharge gas HC amount in terms of suppressing atmospheric pollution. FIG. 5 is a view that illustrates the relationship between the integrated tail HC amount when starting the engine 1 (for example, during a period until twenty seconds elapses from engine start-up) and the length of the delay period. The relationship between the integrated tail HC amount when starting the engine 1 (hereunder, referred to simply as "integrated tail HC amount") and the delay period exhibits the tendency shown in FIG. 5 for the reasons described above based on FIG. 3. More specifically, up to a certain limit, the integrated tail HC amount decreases as the delay period is increased. This is due to the influence of a decrease in the engine discharge gas HC amount that is caused by lengthening of the delay period. However, when the delay period is lengthened in excess of the aforementioned limit, conversely, the integrated tail HC amount increases. This is due to the influence of a delay in warming up of the exhaust gas purification catalyst that is caused by lengthening the delay period. Thus, in the relationship between the integrated tail HC amount and the delay period, there is a delay period in which the integrated tail HC amount is the local minimum amount.

According to the example shown in FIG. 5, since the integrated tail HC amount is the local minimum when the delay period is between 1.25 to 1.5 cycles, the optimal delay period is 1.25 to 1.5 cycles. However, when conditions such as the engine coolant temperature at engine start-up or the alcohol concentration of the fuel or the like are different, the optimal delay period at which the integrated tail HC amount becomes the local minimum will be a different value because the ease with which the fuel evaporates will be different.

The reason the integrated tail HC amount is the local minimum when the delay period is between 1.25 and 1.5 cycles in the example shown in FIG. 5 is as follows. In the graph of the engine discharge gas HC amount denoted by reference character A in FIG. 3, there is a point at which the slope changes suddenly (hereunder, referred to as "slope change point"). The position of the slope change point substantially matches the position at which the integrated tail HC amount is the local minimum. In the region up to the slope change point, the slope of the decrease in the engine discharge gas HC amount is steep, while in the region after the slope change point the slope of the decrease in the engine discharge gas HC amount is gradual. Therefore, in the region up to the slope change point, lengthening the delay period has a significant influence with respect to reducing the engine discharge gas HC amount. In contrast, in the region after the slope change point, the influence that lengthening the delay period has on reducing the engine discharge gas HC amount decreases, and the influence of a delay in warm-up of the exhaust gas purification catalyst that is caused by lengthening the delay period increases relatively. For these reasons, the integrated tail HC amount becomes the local minimum at a position that is substantially the same as the slope change point.

The reason that a slope change point arises in the graph of the engine discharge gas HC amount denoted by reference character A in FIG. 3 is that a slope change point appears in the graph of the delayed cylinder starting engine speed shown in FIG. 4. As described above, the higher that the delayed cylinder starting engine speed is, the greater the decrease in the engine discharge gas HC amount, while the lower that the delayed cylinder starting engine speed is, the greater the increase in the engine discharge gas HC amount. Therefore, because the slope change point appears in the graph of the delayed cylinder starting engine speed shown in FIG. 4, a slope change point arises in the graph of the engine discharge gas HC amount denoted by reference character A in FIG. 3. When conditions such as the engine coolant temperature at engine start-up or the alcohol concentration of the fuel are different, the size of the torque generated by a single combustion will also be different because the ease with which the fuel evaporates will be different. Consequently, the slope of the increase in the engine speed at engine start-up will also differ. Hence, the position of the slope change point that appears in the graph of the delayed cylinder starting engine speed shown in FIG. 4 differs according to conditions such as the engine coolant temperature at engine start-up or the alcohol concentration of the fuel. Accordingly, the position of the slope change point that appears in the graph of the engine discharge gas HC amount denoted by reference character A in FIG. 3 also differs according to conditions such as the engine coolant temperature at engine start-up or the alcohol concentration of the fuel. However, a fact that the vicinity of the slope change point that appears in the graph of the engine discharge gas HC amount denoted by reference character A in FIG. 3 is a position at which the integrated tail HC amount is the local minimum in the graph of the integrated tail HC amount as shown in FIG. 5 holds true irrespective of conditions such as the engine coolant temperature at engine start-up or the alcohol concentration of the fuel.

Figure 6:
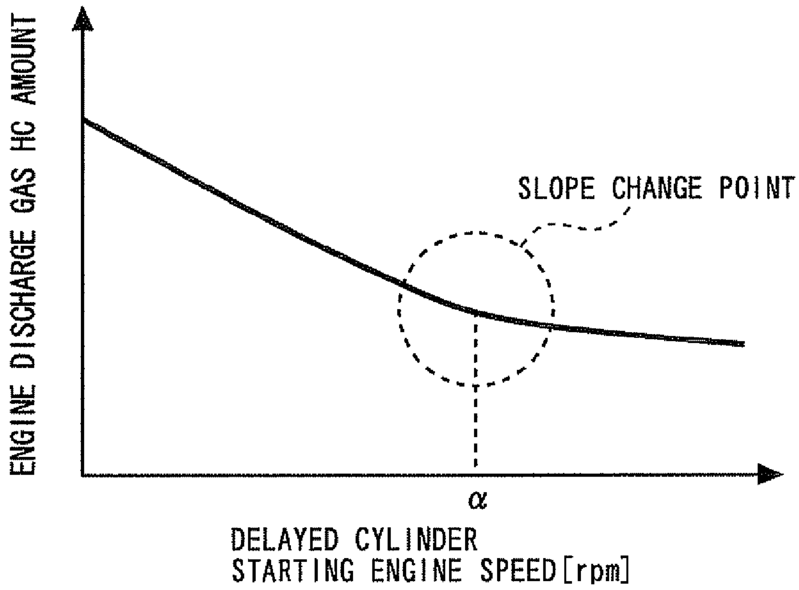
FIG. 6 is a view that illustrates the relationship between the engine discharge gas HC amount and the delayed cylinder starting engine speed.

FIG. 6 is a view that illustrates the relationship between the engine discharge gas HC amount and the delayed cylinder starting engine speed. In the graph shown in FIG. 6 also, a slope change point appears that corresponds to the slope change point in the graph of the engine discharge gas HC amount denoted by reference character A in FIG. 3. As shown in FIG. 6, a delayed cylinder starting engine speed that corresponds to the slope change point is taken as "α". If control is performed so that the delayed cylinder starting engine speed is in the vicinity of "α" when starting the fuel supply to the delayed cylinders, since this is equivalent to making the delay period match the position of the slope change point on the graph of the engine discharge gas HC amount shown in FIG. 3, the integrated tail HC amount can be made the local minimum. Therefore, according to the present embodiment, a configuration is adopted in which the aforementioned "α" is taken as a target engine speed, and the start of fuel supply to the delayed cylinders is controlled so that the delayed cylinders start an initial combustion cycle at a timing at which the engine speed is equal to or greater than the target engine speed α.

Figure 7:
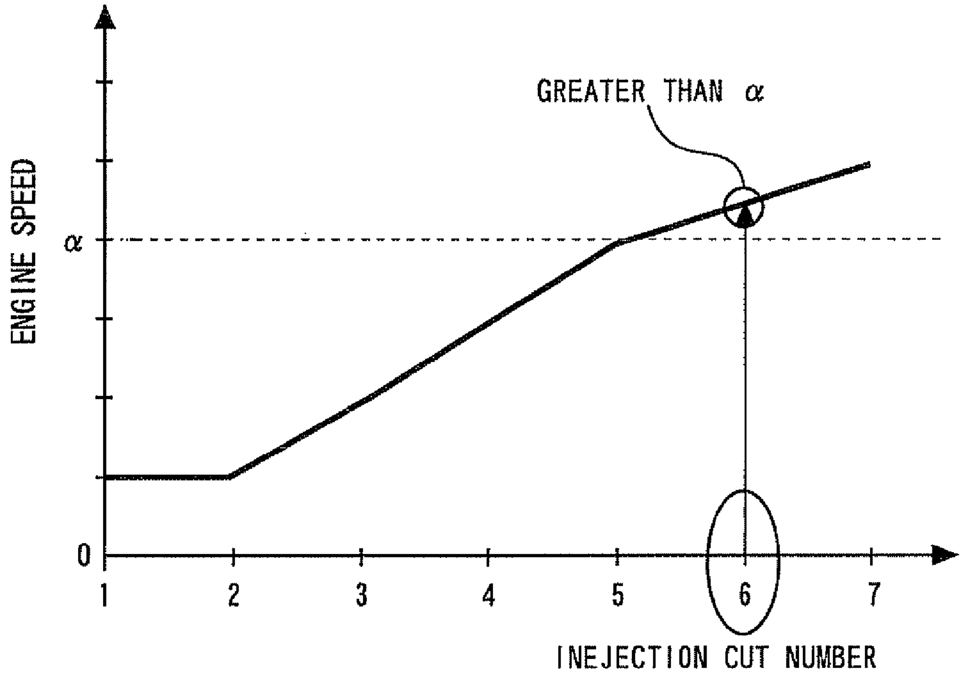
FIG. 7 is a view for describing the timing at which fuel supply to the delayed cylinders starts.

FIG. 7 is a view for describing the timing at which fuel supply to the delayed cylinders starts. The term "injection cut number" with respect to the axis of abscissa refers to the number of times that injection to the delayed cylinders is cut. More specifically, in terms of the example shown in FIG. 2, #8 in the first cycle is a first time that injection is cut, #3 is a second time that injection is cut, #5 is a third time that injection is cut, and #2 is a fourth time that injection is cut. Further, #8 in the second cycle is a fifth time that injection is cut, and #3 is a sixth time that injection is cut. The term "engine speed" with respect to the axis of ordinate refers to the engine speed at the timing at which the intake valve opens in a cycle that corresponds to the respective times that injection is cut. According to the example shown in FIG. 7, the engine speed corresponding to the sixth time that fuel injection is cut is greater than the target engine speed α. Therefore, from the sixth time, cutting of fuel injection to the delayed cylinders is stopped, and injection of fuel to the delayed cylinders begins. More specifically, in terms of the example shown in FIG. 2, although fuel injection was scheduled to be cut for a sixth time at #3 in the second cycle, the sixth fuel injection cut operation is not performed, and fuel is supplied from the fuel injectors 6 to all the cylinders from #3 in the second cycle onwards.

Figure 8:
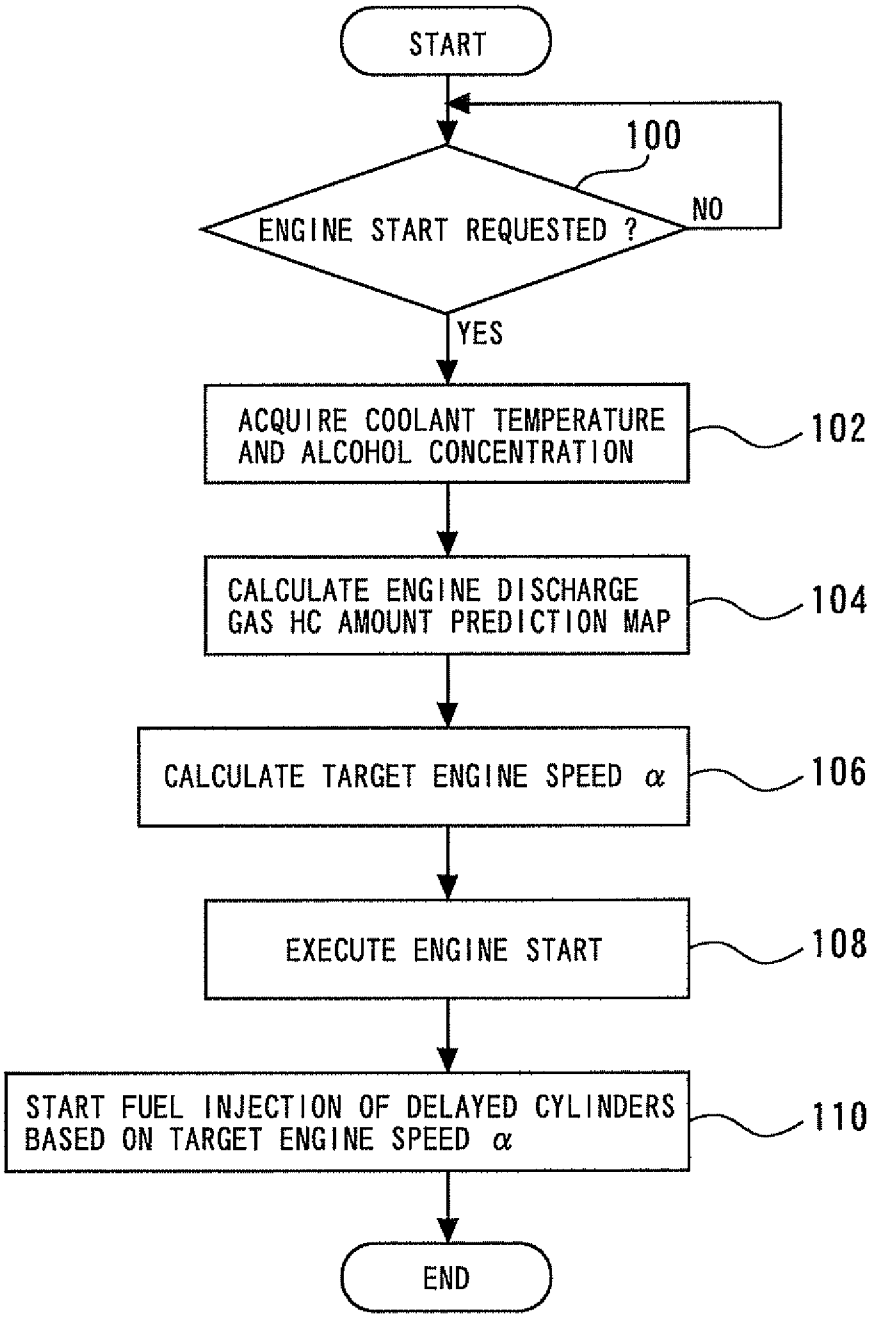
FIG. 8 is a flowchart illustrating a routine that is executed by Embodiment 1 of the present invention.

FIG. 8 is a flowchart of a routine that the ECU 10 according to the present embodiment executes to implement the above described functions. According to the routine shown in FIG. 8, first, the ECU 10 determines whether or not start-up of the engine 1 is being requested (step 100). If start-up of the engine 1 is being requested, first, the ECU 10 acquires a value of an engine coolant temperature that is detected by the water temperature sensor 21 and a value of the alcohol concentration of the fuel that is detected by the fuel property sensor 25 (step 102). Next, based on the acquired values for the engine coolant temperature and the alcohol concentration, the ECU 10 calculates the relationship between a predicted value of the engine discharge gas HC amount and the delayed cylinder starting engine speed (step 104).

The relationship calculated in step 104 is represented by a map as shown in FIG. 6. The higher that the engine coolant temperature is, the easier it is for fuel to evaporate, and thus the smaller the amount of unburned HC emissions is. Consequently, because the engine discharge gas HC amount decreases as the engine coolant temperature increases, there is a tendency for a curve of the aforementioned map to shift downward. Conversely, as the engine coolant temperature decreases, there is a tendency for a curve of the aforementioned map to shift upward because the engine discharge gas HC amount increases. Further, at a low temperature, the higher that the alcohol concentration of the fuel is, the more difficult it is for the fuel to evaporate, and thus the greater the degree to which the amount of unburned HC emissions increases. Therefore, there is a tendency for the curve of the aforementioned map to shift upward as the alcohol concentration increases, since the engine discharge gas HC amount increases. Information regarding these tendencies is stored in advance in the ECU 10. In step 104, based on such information and on the values for the engine coolant temperature and the alcohol concentration acquired in step 102, the ECU 10 calculates a map of predicted values of the engine discharge gas HC amount as shown in FIG. 6 (hereunder, referred to as "engine discharge gas HC amount prediction map").

Furthermore, the engine discharge gas HC amount decreases as the intake air amount increases. This is because the intake valve peripheral flow rate increases accompanying an increase in the intake air amount, and consequently evaporation of fuel adhered to the wall surface of the intake port or to the intake valve is accelerated in accordance with the increase in the intake valve peripheral flow rate. In the aforementioned step 104, taking this fact into consideration, the map of predicted values of the engine discharge gas HC amount may be further corrected in accordance with the intake air amount that is detected by the intake pipe pressure sensor 20 or the air flow meter 24. If the intake air amount at start-up is substantially constant each time, this correction need not be performed.

After the processing in step 104, the target engine speed α is calculated (step 106). In this case, a value of the delayed cylinder starting engine speed at the slope change point of the engine discharge gas HC amount prediction map that is calculated in the aforementioned step 104 is set as the target engine speed α. The method of identifying the slope change point may be, for example, a method in which a point at which a second-order differential value is a maximum value is identified as the slope change point on the engine discharge gas HC amount prediction map.

Next, the ECU 10 executes processing to start-up the engine 1 (step 108). The following processing is performed in the present step 108. First, the engine 1 is cranked by the starting device. Further, a cylinder discrimination process is carried out based on a signal of the cylinder discrimination sensor 23, and fuel is supplied by the fuel injectors 6 to cylinders other than delayed cylinders. A cylinder group to serve as the delayed cylinders may be previously determined, or may be decided based on the result of the cylinder discrimination process. When deciding the delayed cylinders based on the result of the cylinder discrimination process, for example, the delayed cylinders may be decided in the following manner. Based on the result of the cylinder discrimination process, a cylinder that is determined as being capable of carrying out combustion first and cylinders that are at intervals of one cylinder in the ignition order from the aforementioned cylinder that is capable of carrying out combustion first are taken as objects for fuel supply, and the other cylinders are taken as delayed cylinders.

When start-up is executed and combustion is carried out in the cylinders to which fuel is injected, the engine speed increases. In step 110, the ECU 10 starts the fuel supply to the delayed cylinders so that the initial combustion cycle of the delayed cylinders start at a timing at which the engine speed is equal to or greater than the target engine speed α calculated in the aforementioned step 106. More specifically, for example, the ECU 10 performs the following control. First, based on the values of the engine coolant temperature and the alcohol concentration acquired in step 102, in the manner described hereafter the ECU 10 calculates a map (hereunder, referred to as "engine speed prediction map") as shown in FIG. 7 for predicting a rise in the engine speed at start-up. The higher the engine coolant temperature is, since the fuel evaporates more easily, the greater the amount of fuel that is combusted in the cylinders. Therefore, there is a tendency for the rate of increase in the engine speed to increase as the engine coolant temperature increases, because the amount of torque generated in a single combustion increases. More specifically, there is a tendency for the slope of the engine speed prediction map to become steeper as the engine coolant temperature increases. Conversely, there is a tendency for the slope of the engine speed prediction map to become more gradual as the engine coolant temperature decreases, because the rate of increase in the engine speed decreases. Further, at a low temperature, there is a tendency for the amount of torque that is generated by a single combustion to decrease as the alcohol concentration of the fuel increases, because it becomes more difficult for the fuel to evaporate. Consequently, there is a tendency for the slope of the engine speed prediction map to become more gradual as the alcohol concentration increases. Information regarding these tendencies is previously stored in the ECU 10. The ECU 10 calculates the engine speed prediction map based on such information as well as the values of the engine coolant temperature and the alcohol concentration that are acquired in step 102. Next, by applying the target engine speed α calculated in the aforementioned step 106 to the thus-calculated engine speed prediction map, the ECU 10 determines an injection cut number at which the engine speed becomes greater than or equal to the target engine speed α in the same manner as described above with respect to FIG. 7. The ECU 10 stops cutting the injection of fuel to the delayed cylinders from the time when the engine speed becomes greater than or equal to the target engine speed α, and starts fuel injection to the delayed cylinders. More specifically, from this point onwards the ECU 10 performs control to execute fuel injection with respect to all of the cylinders. According to the above control, a situation is realized in which a delayed cylinder immediately starts an initial combustion cycle when the engine speed becomes greater than or equal to the target engine speed α. Consequently, since the integrated tail HC amount (that is, the amount of unburned HC that is discharged to the atmosphere due to start-up of the engine 1) becomes a value in the vicinity of the local minimum value, the integrated tail HC amount can be reliably decreased.

In this connection, in step 110, the following control may be performed instead of the control described above. According to the present embodiment, at start-up, control is performed so that fuel injection from the fuel injectors 6 ends before the corresponding intake valves open. Therefore, for each cylinder, a predetermined timing (for example, a timing during an exhaust stroke of the previous cycle) before the intake valve opens is set as a fuel injection set timing. It is necessary to determine whether or not to execute fuel injection with respect to the relevant cylinder before the fuel injection set timing. A predicted value for the amount by which the engine speed increases during the period from the fuel injection set timing to the timing at which the intake valve opens is taken as δ. The period from the fuel injection set timing to the timing at which the intake valve opens is a very small time period, and the increase in the engine speed during that time period is not large. Therefore, the value of δ may be a fixed value that is previously set. However, as described above, since the rate of increase in the engine speed is influenced by the engine coolant temperature and the alcohol concentration of the fuel, when it is desired to further increase the accuracy of δ, the value of δ may be corrected in accordance with the values of the engine coolant temperature and the alcohol concentration of the fuel. In the present control, immediately prior to the fuel injection set timing for each delayed cylinder, the ECU 10 acquires an actual engine speed NE that is detected by the crank angle sensor 22, and determines or not whether the following expression holds.

$$NE \geq \alpha - \delta \quad (1)$$

If the above expression (1) does not hold, it can be predicted that the engine speed at the timing at which the intake valve of the delayed cylinder opens will not reach the target engine speed α. Therefore, in this case, injection of fuel to the delayed cylinder is deferred. More specifically, the fuel supply to the delayed cylinder is not started yet. In contrast, if the above expression (1) does hold, it can be predicted that the engine speed at the timing at which the intake valve of the delayed cylinder opens will be equal to or greater than the target engine speed α. Therefore, in this case, fuel injection to the delayed cylinder is executed. More specifically, the fuel supply to the delayed cylinder is started. According to the above control, it is possible to decide whether or not to start the supply of fuel to a delayed cylinder based on the engine speed NE that are actually detected. Therefore, a situation in which a delayed cylinder immediately starts an initial combustion cycle when the engine speed has become equal to or greater than the target engine speed α can be realized with higher accuracy.

In this connection, although according to the present embodiment the ECU 10 performs control so that the starting engine speed becomes equal to or greater than the target engine speed α, such control is not necessarily required according to the present invention. For example, a configuration may be adopted such that the timing for starting the supply of fuel to a delayed cylinder is controlled so that a difference between the starting engine speed and the target engine speed α becomes less than a predetermined reference value. In such a case, the starting engine speed may be less than the target engine speed α.

In the above described Embodiment 1, the water temperature sensor 21 corresponds to "representative temperature acquiring means" according to the first invention, and the fuel property sensor 25 corresponds to "alcohol concentration acquiring means" according to the fourth invention. Further, "fuel supply control means" according to the first invention is realized by the ECU 10 executing the processing of the routine shown in FIG. 8, "engine discharge gas HC amount predicting means" according to the first invention is realized by the ECU 10 executing the processing of the above described step 104, and "target engine speed calculating means" according to the first invention and the fifth invention is realized by the ECU 10 executing the processing of the above described step 106.

Embodiment 2

Figure 9:
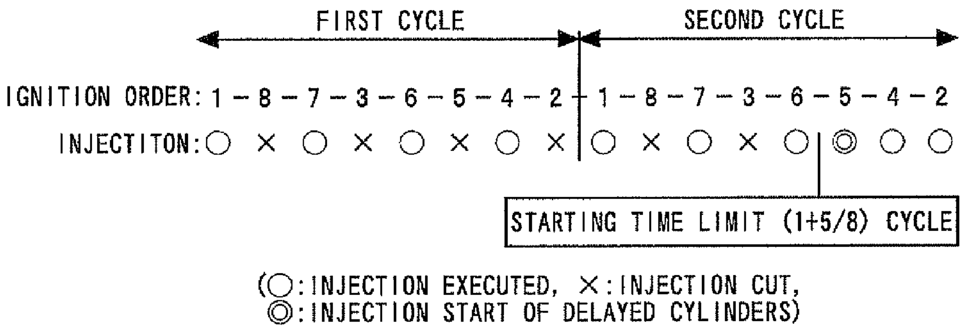
FIG. 9 is a view for describing fuel supply control at start-up according to Embodiment 2 of the present invention.
Figure 10:
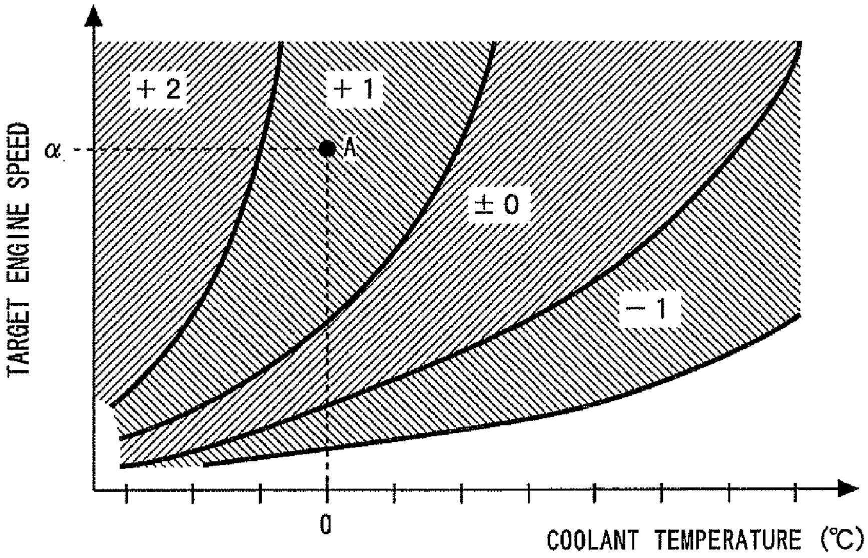
FIG. 10 is a view that illustrates a map for correcting the combustion count based on the engine coolant temperature and the target engine speed according to Embodiment 2 of the present invention.

Next, Embodiment 2 of the present invention is described referring to FIG. 9 and FIG. 10. The description of Embodiment 2 centers on differences with respect to the foregoing Embodiment 1, and a description of like items is simplified or omitted.

According to the control of the above described Embodiment 1, since the ECU 10 performs control so that the starting engine speed becomes equal to or greater than the target engine speed α, the slower that the rate of increase in the engine speed is, the longer the delay period becomes. Since only some of the cylinders perform combustion during the delay period, the combustion intervals are longer that when the engine 1 is operating on all cylinders. As a result, in comparison to when the engine 1 is operating on all cylinders, rotational fluctuations increase and the engine 1 is liable to vibrate more. Consequently, if the delay period is too long, a state in which there are large vibrations continues for a long time, and this is not a preferable situation. Therefore, according to the present embodiment, a time limit for starting fuel supply to the delayed cylinders (hereunder, referred to as "starting time limit") is previously set, and if the starting time limit is exceeded, the fuel supply to the delayed cylinders is forcibly started irrespective of the engine speed.

FIG. 9 is a view for describing fuel supply control at start-up according to the present embodiment. The starting time limit is set using the number of cycles. In the example illustrated in FIG. 9, the starting time limit is set to (1+5/8) cycles. This means that #5 in the second cycle in the ignition order exceeds the starting time limit. Therefore, in this case, the fuel supply to the delayed cylinders is forcibly started from cylinder #5 in the second cycle in the ignition order irrespective of the engine speed, to thereby perform operation on all cylinders. According to the present embodiment, the ECU 10 performs control according to the routine shown in FIG. 8 according to Embodiment 1 as described above, and furthermore, if fuel supply to the delayed cylinders has not started by the time the starting time limit expires, the ECU 10 performs control so as to forcibly start the fuel supply to the delayed cylinders from the time the starting time limit expires, and continue the fuel supply to the delayed cylinders thereafter. According to this control, since operation on all cylinders is forcibly performed from the time the starting time limit expires and continues thereafter, a state in which large vibrations of the engine 1 continue for a long time at start-up can be reliably prevented.

However, when the fuel supply to the delayed cylinders is forcibly started based on the starting time limit, because the starting engine speed has not reached the target engine speed α, the amount of unburned HC that is generated in the initial combustion cycle of the delayed cylinders increases. As a result, the integrated tail HC amount at start-up increases. Therefore, ideally a situation in which the fuel supply to the delayed cylinders is forcibly started based on the starting time limit is avoided as much as possible. To realize this ideal, according to the present embodiment a configuration may be adopted in which the following control is also performed together with the above described control.

As described in the foregoing, when the engine coolant temperature is low at start-up or the alcohol concentration of the fuel is high, there is a tendency for the rate of increase in the engine speed to become slow. Further, even if the rate of increase in the engine speed is the same, if the target engine speed α is high, it will take time for the engine speed to reach the target engine speed α. In such cases, it can be predicted that there is a high possibility that the engine speed will not reach the target engine speed α before the starting time limit is exceeded. Therefore, in such cases, an increase in the engine speed is promoted by increasing the number of combustions (hereunder, referred to as "combustion count") in the entire engine 1 that are scheduled within the starting time limit.

FIG. 10 is a view that illustrates a map for correcting the combustion count based on the engine coolant temperature and the target engine speed α. In the map shown in FIG. 10, a region that increases the combustion count by 2, a region that increases the combustion count by 1, a region that neither increases nor decreases the combustion count, and a region that decreases the combustion count by 1 are set. According to the present embodiment, when executing start-up of the engine 1 in step 108 in FIG. 8, the combustion count is corrected by applying the engine coolant temperature acquired in step 102 and the target engine speed α calculated in step 106 to the map shown in FIG. 10. For example, when the engine coolant temperature is 0° C. and the target engine speed α is the value shown in FIG. 10, a point A that is defined by the aforementioned values is in a region that increases the combustion count by 1. Therefore, in this case, it is decided that the combustion count is to be increased by 1. In the example shown in FIG. 9, ordinarily, combustion is scheduled to be carried out seven times (the number of circles), and fuel injection is scheduled to be cut six times. When the combustion count is increased by 1, fuel injection may be executed in place of any one of the six times that fuel injection is scheduled to be cut. When increasing the combustion count within the starting time limit in this manner, while fuel injection may be executed in place of any one of the plurality of times that fuel injection is scheduled to be cut, it is desirable to execute fuel injection in place of cutting fuel injection in order from the final time among the plurality of times that fuel injection is scheduled to be cut. In terms of the example shown in FIG. 9, when increasing the combustion count by 1, it is desirable to replace the operation to cut fuel injection at #3 in the second cycle with an operation to execute fuel injection. As described in the foregoing, when a cylinder carries out combustion, the higher that the engine speed is, the greater the degree to which evaporation of fuel or improvement of combustion is promoted because the intake valve peripheral flow rate quickens and a tumble becomes stronger, and thus the amount of unburned HC emissions decreases. Therefore, when increasing the combustion count within the starting time limit, it is preferable to add the combustion event to the rear of the ignition order as much as possible because the amount of unburned HC emissions caused by the added combustion event can be reduced since the engine speed at the time of the added combustion event is high.

According to the map shown in FIG. 10, the lower that the engine coolant temperature is, the more that the combustion count can be increased, and similarly the higher that the target engine speed α is, the more that the combustion count can be increased. Therefore, when the engine coolant temperature is low or when the target engine speed α is high, an increase in the engine speed can be promoted. Hence, even in such cases a configuration can be adopted so that the engine speed can reach the target engine speed α before the starting time limit expires. Therefore, the integrated tail HC amount can be reliably reduced at start-up.

According to the map shown in FIG. 10, the combustion count can be decreased when the engine coolant temperature is high or the target engine speed α is low. When the engine coolant temperature is high or when the target engine speed α is low, it can be predicted that the time required until the engine speed reaches the target engine speed α will be short, and there will be surplus time until the starting time limit expires. In such cases it can be determined that, even if the combustion count is decreased, the engine speed can arrive at the target engine speed α before the starting time limit expires. Therefore, by decreasing the combustion count in such cases, it is possible to further decrease the integrated tail HC amount at start-up.

Although a case has been described above in which the combustion count is corrected based on the engine coolant temperature and the target engine speed α, a configuration may also be adopted in which the combustion count is further corrected based on the alcohol concentration of the fuel. More specifically, when the alcohol concentration is high, a correction may be performed so that the combustion count is increased compared to when the alcohol concentration is low.

In the above described Embodiment 2, "combustion count correcting means" according to the third invention is realized by the ECU 10 correcting the combustion count based on the map shown in FIG. 10.

Embodiment 3

Figure 11:
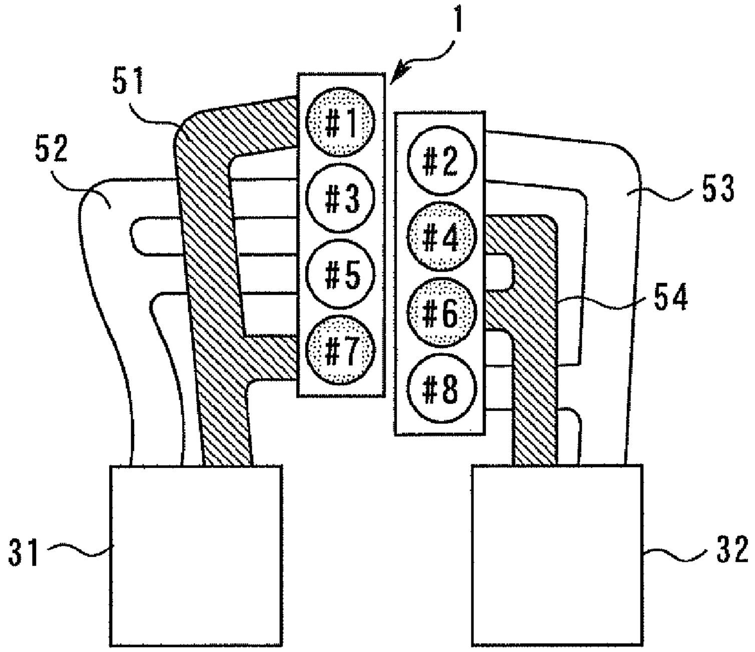
FIG. 11 is a view for describing the configuration of an exhaust system of the engine 1 according to Embodiment 3 of the present invention.

Next, Embodiment 3 of the present invention is described referring to FIG. 11. The description of Embodiment 3 centers on differences with respect to the above described embodiments, and a description of like items is simplified or omitted.

FIG. 11 is a view for describing the configuration of an exhaust system of the engine 1 of the present embodiment. As shown in FIG. 11, according to the present embodiment, on the bank on the left side in the figure, cylinders #1 and #7 share an exhaust manifold 51, and cylinders #3 and #5 share an exhaust manifold 52. The exhaust manifolds 51 and 52 are connected to an exhaust gas purification catalyst 31. On the bank on the right side in FIG. 11, cylinders #2 and #8 share an exhaust manifold 53, and cylinders #4 and #6 share an exhaust manifold 54. The exhaust manifolds 53 and 54 are connected to an exhaust gas purification catalyst 32. A comparison of the surface areas (outer surface area) of the respective exhaust manifolds 51 to 54 shows that exhaust manifold 54 has the smallest surface area, and the exhaust manifold 51 has the next smallest surface area.

According to the engine 1 of the present embodiment, similarly to the example shown in FIG. 2, cylinders #2, #3, #5, and #8 are taken as delayed cylinders, while fuel is supplied from the beginning of start-up to cylinders #1, #4, #6, and #7. More specifically, only cylinders #1, #4, #6, and #7 carry out combustion in the delay period. During the delay period, air is discharged from the exhaust valves of the delayed cylinders that do not carry out combustion. In the delay period, exhaust gas (burned gas) of cylinders #1 and #7 that carry out combustion on the left bank is fed to the exhaust gas purification catalyst 31 via the exhaust manifold 51. In contrast, air discharged from the cylinders #3 and #5 that do not carry out combustion is fed to the exhaust gas purification catalyst 31 via the exhaust manifold 52. Further, on the right bank, exhaust gas (burned gas) of cylinders #4 and #6 that carry out combustion is fed to the exhaust gas purification catalyst 32 via the exhaust manifold 54, and air discharged from the cylinders #2 and #8 that do not carry out combustion is fed to the exhaust gas purification catalyst 32 via the exhaust manifold 53. It is thereby possible to prevent high-temperature burned gas from mixing with low-temperature air. Therefore, since oxidation (after burning) of HC can be efficiently induced while the burned gases pass through the exhaust manifolds 51 and 54, high-temperature gas can be caused to flow into the exhaust gas purification catalysts 31 and 32. Further, according to the present embodiment, high-temperature burned gases pass through the exhaust manifolds 51 and 54 that have a small surface area, and air passes through the exhaust manifolds 52 and 53 that have a large surface area. It is therefore possible to reduce the release of heat from the exhaust manifolds 51 and 54 through which the high-temperature burned gases pass, and thus the burned gases can be maintained at a high temperature. Consequently, according to the present embodiment, warming up of the exhaust gas purification catalysts 31 and 32 can be accelerated. As a result, the integrated tail HC amount at start-up can be further reduced.

Embodiment 4

Figure 12:
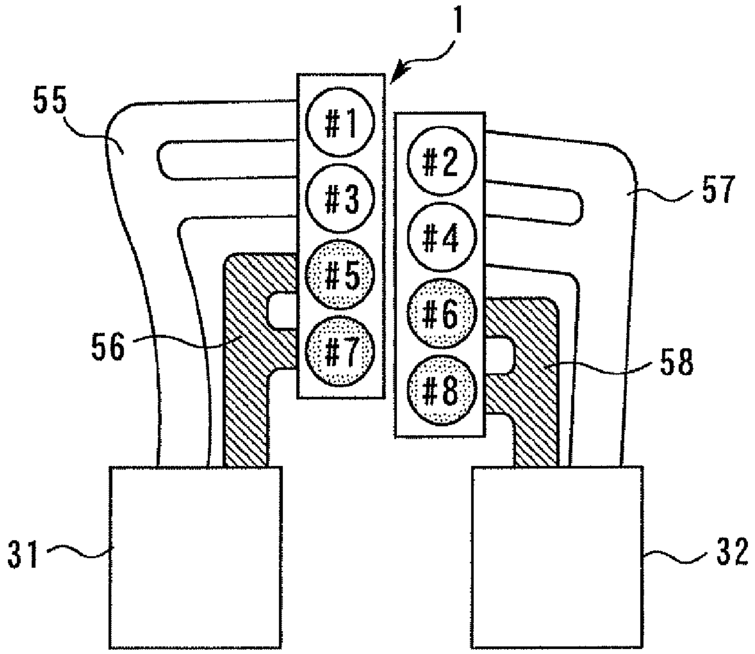
FIG. 12 is a view for describing the configuration of an exhaust system of the engine 1 according to Embodiment 4 of the present invention.

Next, Embodiment 4 of the present invention is described referring to FIG. 12. The description of Embodiment 4 centers on differences with respect to the above described embodiments, and a description of like items is simplified or omitted.

FIG. 12 is a view for describing the configuration of an exhaust system of the engine 1 of the present embodiment. As shown in FIG. 12, according to the present embodiment, on the bank on the left side in the figure, cylinders #1 and #3 share an exhaust manifold 55, and cylinders #5 and #7 share an exhaust manifold 56. The exhaust manifolds 55 and 56 are connected to the exhaust gas purification catalyst 31. On the bank on the right side in FIG. 12, cylinders #2 and #4 share an exhaust manifold 57, and cylinders #6 and #8 share an exhaust manifold 58. The exhaust manifolds 57 and 58 are connected to the exhaust gas purification catalyst 32. A comparison of the surface areas (outer surface area) of the respective exhaust manifolds 55 to 58 shows that exhaust manifold 58 has the smallest surface area, and the exhaust manifold 56 has the next smallest surface area.

According to the engine 1 of the present embodiment, cylinders #1, #2, #3, and #4 are taken as delayed cylinders, while fuel is supplied from the beginning of start-up to cylinders #5, #6, #7, and #8. Thus, similarly to Embodiment 3, high-temperature burned gas can be prevented from mixing with low-temperature air. Therefore, since oxidation (after burning) of HC can be efficiently induced while the burned gases pass through the exhaust manifolds 56 and 58, high-temperature gas can be caused to flow into the exhaust gas purification catalysts 31 and 32. Further, high-temperature burned gases pass through the exhaust manifolds 56 and 58 that have a small surface area, and air passes through the exhaust manifolds 55 and 57 that have a large surface area. It is therefore possible to reduce the release of heat from the exhaust manifolds 56 and 58 through which the high-temperature burned gases pass, and thus the burned gases can be maintained at a high temperature. Consequently, similarly to Embodiment 3, warming up of the exhaust gas purification catalysts 31 and 32 can be accelerated. As a result, the integrated tail HC amount at start-up can be further reduced.

In Embodiment 3 shown in FIG. 11, the exhaust manifolds 51 and 53 are connected to two cylinders that are not adjacent to each other. In contrast, according to the present embodiment, each of the exhaust manifolds 55 to 58 is connected to two adjacent cylinders. It is therefore possible to simplify the arrangement of the exhaust manifolds 55 to 58, and to form the engine 1 in a shape that facilitates manufacture. However, according to the present embodiment, since the cylinders #5, #6, #7, and #8 are combustion cylinders during the delay period, the combustion intervals are not uniform. Consequently, the configuration of Embodiment 3 is superior with respect to decreasing vibrations during the delay period.

REFERENCE SIGNS LIST

1 internal combustion engine
3 surge tank
4 exhaust branch pipe
5 exhaust manifold
6 fuel injector
7 air intake duct
8 throttle
10 ECU
20 intake pipe pressure sensor
21 water temperature sensor
22 crank angle sensor
23 cylinder discrimination sensor
24 air flow meter
25 fuel property sensor
31, 32 exhaust gas purification catalyst
51, 52, 53, 54, 55, 56, 57, 58 exhaust manifold

The invention claimed is:

1. A control apparatus for an internal combustion engine, comprising:

fuel supply control means that, when a multi-cylinder internal combustion engine is started, initially supplies fuel to only some cylinders, and delays a start of fuel supply to a delayed cylinder that is a cylinder other than the cylinders to which fuel is initially supplied;

representative temperature acquiring means that acquires a representative temperature of the internal combustion engine;

engine discharge gas HC amount predicting means that, based on predetermined parameters including at least the representative temperature, calculates a relationship between a delayed cylinder starting engine speed that is a engine speed at a timing at which a cycle starts in which the delayed cylinder initially carries out combustion and a predicted value of an engine discharge gas HC amount that is a HC amount that is output from the internal combustion engine when starting the internal combustion engine; and target engine speed calculating means that calculates a target engine speed that is a target value of the delayed cylinder starting engine speed, based on the relationship that is calculated by the engine discharge gas HC amount predicting means;

wherein the fuel supply control means determines a timing at which to start to supply fuel to the delayed cylinder so that the delayed cylinder starting engine speed is in a vicinity of the target engine speed.

2. The control apparatus for an internal combustion engine according to claim 1, wherein when a predetermined time limit is exceeded, irrespective of a engine speed, the fuel supply control means forcibly starts a fuel supply to the delayed cylinder.

3. The control apparatus for an internal combustion engine according to claim 2, further comprising combustion count correcting means that, based on the predetermined parameters and the target engine speed, corrects a number of combustions in the internal combustion engine overall that are scheduled to be carried out within the time limit.

4. The control apparatus for an internal combustion engine according to claim 1, further comprising:

alcohol concentration acquiring means that acquires an alcohol concentration of a fuel that is supplied to the internal combustion engine;

wherein the alcohol concentration is included in the predetermined parameters.

5. The control apparatus for an internal combustion engine according to claim 1, wherein the target engine speed calculating means takes a delayed cylinder starting engine speed of a part at which a slope of the predicted value of the engine discharge gas HC amount changes suddenly in the relationship as the target engine speed.

* * * * *